United States Patent
Groetsch et al.

(10) Patent No.: US 9,666,338 B2
(45) Date of Patent: May 30, 2017

(54) METHOD FOR PRODUCING A CABLE HARNESS AND CABLE HARNESS

(71) Applicant: LEONI BORDNETZ-SYSTEME GMBH, Kitzingen (DE)

(72) Inventors: Matthias Groetsch, Kitzingen (DE); Adolf Hordnung, Geiselwind (DE)

(73) Assignee: Leoni Bordnetz-Systeme GmbH, Kitzingen (DE)

(*) Notice: Subject to any disclaimer, the term of this patent is extended or adjusted under 35 U.S.C. 154(b) by 160 days.

(21) Appl. No.: 14/661,618

(22) Filed: Mar. 18, 2015

(65) Prior Publication Data

US 2015/0228381 A1    Aug. 13, 2015

Related U.S. Application Data

(63) Continuation of application No. PCT/EP2013/002706, filed on Sep. 10, 2013.

(30) Foreign Application Priority Data

Sep. 18, 2012 (DE) .......................... 10 2012 018 382

(51) Int. Cl.
| | |
|---|---|
| *H01B 13/00* | (2006.01) |
| *H01B 7/00* | (2006.01) |
| *B29C 45/14* | (2006.01) |
| *B29C 33/00* | (2006.01) |
| *B29C 39/10* | (2006.01) |

(52) U.S. Cl.
CPC ..... *H01B 13/0013* (2013.01); *B29C 33/0044* (2013.01); *B29C 39/10* (2013.01); *B29C 45/14491* (2013.01); *H01B 7/0045* (2013.01); *B29C 2045/14934* (2013.01)

(58) Field of Classification Search
None
See application file for complete search history.

(56) References Cited

U.S. PATENT DOCUMENTS 4,216,351 A * 8/1980 Brandeau ................ B29C 65/70
174/77 R
4,276,251 A * 6/1981 Bopp .................. B29C 47/0004
174/110 AR (Continued)

FOREIGN PATENT DOCUMENTS

| CN | 2480931 Y | 3/2002 |
| DE | 1913322 A1 | 10/1969 |

(Continued)

*Primary Examiner* — Chau N Nguyen
*Assistant Examiner* — Muhammed Azam
(74) *Attorney, Agent, or Firm* — Laurence A. Greenberg; Werner H. Stemer; Ralph E. Locher

(57) ABSTRACT

A cable harness is surrounded in certain regions by a sheath made of a casting compound. In order to ensure a defined delimitation of the casting compound, even if there is an insert part protruding from the sheath, the method for sealing a tool opening provides that a pressure element is pressed in the radial direction against the insert part. The insert part is clamped between the pressure element and a support element, and the support element remains in the cable harness as a consumable element. The insert part is particularly designed as a heat protection element. The cable harness is used particularly in a thermally stressed environment for a motor vehicle.

14 Claims, 2 Drawing Sheets

(56) References Cited

U.S. PATENT DOCUMENTS

| | | | |
|---|---|---|---|
| 4,405,083 A | 9/1983 | Charlebois et al. | |
| 4,450,871 A * | 5/1984 | Sato | B29C 61/0616 138/137 |
| 4,461,736 A * | 7/1984 | Takagi | B29C 44/12 156/48 |
| 4,533,417 A * | 8/1985 | Puckowski | B29C 47/0016 156/229 |
| 4,868,967 A * | 9/1989 | Holt | F16L 5/02 174/135 |
| 5,105,054 A * | 4/1992 | Kirma | H01B 7/0045 174/2 |
| 5,394,502 A * | 2/1995 | Caron | G02B 6/4473 174/72 A |
| 5,406,871 A * | 4/1995 | Lambert, Jr. | B29C 61/065 138/103 |
| 5,640,884 A * | 6/1997 | Fujiu | B29C 45/14491 280/777 |
| 5,665,936 A * | 9/1997 | Sawamura | H01B 7/0045 174/27 |
| 5,897,911 A * | 4/1999 | Loeffler | A61F 2/82 427/2.25 |
| 6,019,142 A * | 2/2000 | Kurmis | B65B 13/027 140/123.6 |
| 6,302,980 B1 * | 10/2001 | Kortenbach | H01B 7/285 156/227 |
| 6,395,974 B1 * | 5/2002 | Argaut | G01R 31/021 174/21 R |
| 6,410,848 B1 * | 6/2002 | Shrader | H01B 7/186 174/36 |
| 6,428,732 B1 * | 8/2002 | Onoue | B29C 33/12 257/E21.504 |
| 6,849,220 B1 * | 2/2005 | Sundstrom | B01F 5/061 264/259 |
| 2002/0170729 A1 * | 11/2002 | Murakami | B60R 16/0215 174/386 |
| 2003/0029876 A1 * | 2/2003 | Giraud | A47G 19/2288 220/592.17 |
| 2003/0070830 A1 * | 4/2003 | Kondo | B60R 16/0207 174/68.1 |
| 2003/0111251 A1 * | 6/2003 | Arai | B29C 47/025 174/68.1 |
| 2003/0159849 A1 * | 8/2003 | Wermelinger | B29C 47/0023 174/156 |
| 2005/0153576 A1 * | 7/2005 | Fukuda | H01B 7/0045 439/34 |
| 2005/0224280 A1 * | 10/2005 | Aisenbrey | B29C 45/0013 181/148 |
| 2005/0247261 A1 * | 11/2005 | Hattersley, Jr. | B21C 47/14 118/68 |
| 2006/0225909 A1 * | 10/2006 | Kurimoto | H01B 7/365 174/36 |
| 2006/0272842 A1 * | 12/2006 | Vallauri | H02G 1/14 174/73.1 |
| 2007/0095552 A1 * | 5/2007 | Thierolf | H01B 7/0861 174/36 |
| 2007/0102845 A1 * | 5/2007 | Dodwell | B29C 39/021 264/272.11 |
| 2007/0114055 A1 * | 5/2007 | Herborth | B29D 23/001 174/68.1 |
| 2007/0134506 A1 * | 6/2007 | Chasey | B29C 47/0016 428/492 |
| 2007/0256855 A1 * | 11/2007 | Tarte | H01B 7/08 174/117 F |
| 2008/0277607 A1 * | 11/2008 | Sawai | F16K 31/02 251/65 |
| 2008/0289850 A1 * | 11/2008 | Mhetar | H01B 3/427 174/110 R |
| 2009/0308632 A1 * | 12/2009 | Watanabe | H01B 7/20 174/106 R |
| 2010/0018002 A1 * | 1/2010 | Bresney | B29C 66/1122 16/2.2 |
| 2010/0095520 A1 * | 4/2010 | Damour | B29C 44/324 29/745 |
| 2011/0045697 A1 * | 2/2011 | Sawamura | B60R 16/0207 439/587 |
| 2012/0217036 A1 * | 8/2012 | Kuriyagawa | H01B 7/28 174/110 R |
| 2013/0008686 A1 * | 1/2013 | Igarashi | H01B 7/06 174/110 R |
| 2013/0020125 A1 * | 1/2013 | Murata | H02G 3/0487 174/72 A |
| 2013/0032393 A1 * | 2/2013 | Toyama | B60R 16/0215 174/72 A |
| 2013/0037321 A1 * | 2/2013 | Murata | B60R 16/0215 174/72 A |
| 2013/0126232 A1 * | 5/2013 | Sakuma | H01B 7/2825 174/72 A |
| 2013/0256027 A1 * | 10/2013 | Fabiilli | H02G 3/30 174/72 A |
| 2013/0340878 A1 * | 12/2013 | Lee | H01B 17/58 138/140 |
| 2014/0131094 A1 * | 5/2014 | Hamamoto | H02G 3/0481 174/72 A |
| 2014/0165392 A1 * | 6/2014 | Toyama | B60R 16/0215 29/825 |
| 2014/0246230 A1 * | 9/2014 | Takahashi | H01B 13/01263 174/72 A |
| 2015/0228381 A1 * | 8/2015 | Groetsch | B29C 45/14491 174/72 A |

FOREIGN PATENT DOCUMENTS

| | | |
|---|---|---|
| DE | 3710642 A1 | 10/1988 |
| DE | 102004030026 A1 | 1/2006 |
| GB | 1256224 A | 12/1971 |
| WO | 0013940 A1 | 3/2000 |

* cited by examiner

METHOD FOR PRODUCING A CABLE HARNESS AND CABLE HARNESS

BACKGROUND OF THE INVENTION

Field of the Invention

The invention relates to a method for producing a cable harness with an electric wire bundle which is surrounded in certain regions by a sheath made of a casting compound, wherein the wire bundle is placed in a tool mould and the wire bundle is passed through an opening and then is surrounded inside the tool mould by the casting compound. The invention further relates to a cable harness of this kind having an electric wire bundle which is surrounded in certain regions by a sheath of a casting compound.

A method of this kind as well as a cable harness of this kind can be concluded by way of example from the DE 19 13 322 C.

In order to form the cast or foamed sheaths in the case of cable harnesses a wire bundle is placed in a tool mould and then a casting or foam substance is introduced into the mould so that the sheath is formed.

From the DE 37 10 642 A1 a dimensionally stable cable harness is known which has a wire bundle surrounded by a foam sleeve and with defined dimensionally stable branches.

The casting or foam substance is normally a very thin fluid in the processing state so that special measures are required to seal off the tool mould at the end in the region of an opening from where the wire bundle exits. From the DE 10 2004 030 026 A1 a slider arrangement is known by way of example for sealing off the opening. From the DE 19 13 322 C can be drawn the use of elastic inserts for sealing off the wire bundle. The wire bundle is thereby surrounded by a banding.

Starting from this the object of the invention is to provide a method for producing a cable harness as well as a cable harness wherein the sheath has a defined delimitation in the region of the outlet of the wire bundle.

BRIEF SUMMARY OF THE INVENTION

As regards the method this is achieved according to the invention as claimed. As regards the cable harness this is achieved according to the invention as claimed. The advantages and preferred configurations outlined below with reference to the method and to the cable harness are to apply equally to both the cable harness and the method.

According to this it is proposed that an insert part is placed at least with one end region into the tool mould in order to embed the insert part in the end region in the casting compound. The insert part is guided together with the wire bundle comprising at least one electric wire out from the casting chamber of the tool mould through an opening. For a reliable seal at the outlet point the tool mould has a pressure element which is pressed radially against the insert part. In order to be able to reliably take up the radial pressure force a support element is additionally provided which is placed between the wire bundle and the insert part. The support element therefore defines quasi an abutment for the pressure element so that the insert part is clamped between the pressure element and support element. A defined separating line is thereby provided for the usually very thin liquid casting compound during the casting or injection moulding process. Overall a clear delimitation is thereby achieved in the transition region between the sheath and the insert part emerging from the sheath. The support element is therefore embedded jointly with the insert part at least in part in the casting compound and therefore forms a consumable element which remains in the cable harness.

Insofar as the term "casting compound" is used here this is to mean any substance which is introduced in fluid or viscous form into the tool mould and is capable of hardening. More particularly a polyurethane foam system known per se is used as the casting or cast compound which typically has a very low viscosity by way of example in the region of 400 nPa*s.

By pressure element is generally meant an element which is suitable for transferring an external pressure force.

The cable harness produced according to this method and having an electric wire bundle surrounded in certain regions by a sheath made of a casting compound is therefore also characterized in that the insert part exits together with the wire bundle at the end from the casting compound and forms outside of the casting compound a free outer side of the cable harness and thus for the wire bundle. The support element is arranged between the insert part and the wire bundle in an end region of this free outer side which is thus adjoined by the sheath. The support element is thereby preferably only arranged in this transition region and does not extend over the entire length of the insert part. The support element is thereby preferably a dimensionally stable inherently rigid element, more particularly a sleeve, which surrounds the wire bundle in the manner of a ring. Since the casting compound surrounds the wire bundle and at the same time the insert part is arranged radially on the outside, the insert part is spaced from the wire bundle so that a free radial space, more particularly an annular space is formed between the wire bundle and the insert part.

By free outer side is generally meant here that the insert part delimits the wire bundle radially on the outside, preferably without arranging a further sheath or casing around the insert part.

The insert part is thereby preferably designed as a heat protection element for the wire bundle.

The cable harness preferably serves as a whole for use in a motor vehicle, more particularly in the engine chamber, and is arranged at least close to the component parts which become hot during use. The wire bundle is therefore protected from the heat by means of the insert part which is thus embedded by an end region in the sheath but otherwise defining outside of the sheath a protection element for the wire bundle. A complete embedding of the wire bundle in a high-temperature-resistant plastics is therefore not necessary. This thereby reduces the material costs and also reduces the space required. For an efficient heat protection function the insert part is formed from a temperature-stable material, by way of example from a temperature-stable plastics or also more particularly from metal. More expediently it has a metallized or even metallic and more particularly a reflective surface.

In the case of the method, in order to achieve a secure seal an external pressure force is exerted on the pressure element and is transferred to the support element. The pressure element is for this purpose formed in a preferred configuration as a separate dimensionally-stable component part on the tool mould in the region of the opening through which the wire bundle and the insert part exit together. The component part itself can also define at least in part the opening. The component part is thereby preferably arranged displaceable in the radial direction relative to a wall of the tool mould. The casting chamber is restricted in the longitudinal direction of the cable through wall regions of the tool mould. Therefore only the opening is closed at the end by the pressure element. As a result of the separate configuration the pressure element can be formed suitable for transferring high compressive forces. The pressure element itself is thereby mounted either at or also in a recess of the wall of the tool mould.

In a particularly advantageous configuration the insert part extends in the longitudinal direction of the cable between two end regions wherein one pressure element is pressed against the insert part in each end region. Only the end regions are thereby each embedded in a respective sheath so that preferably a sheath of casting compound adjoins the insert part at both ends. The insert part is not enclosed by the casting compound between these two end regions.

The insert part is thereby expediently inserted into one common tool mould comprising the two pressure elements which has two casting chambers spaced from one another in the longitudinal direction of the cable and between which the insert part extends. The insert part is therefore embedded and held at both ends in the respective sheaths. The insert part extends over the entire free length between the sheaths and protects the wire bundle in this region which is not encased by the casting compound.

According to a first design variation the insert part surrounds the wiring as a whole in the manner of a tube so that this is protected on all sides. The insert part itself is thereby formed by way of example as a tube through which the wire bundle is guided. Alternatively the possibility also exists of designing the insert part in the manner of a mesh or winding or even of a combination of a tube and a winding. More expediently the insert part is thereby formed by a foil or has at least at one foil. In a particularly preferred configuration the insert part is formed as a hybrid component part of several layers and preferably has an inner tube, by way of example a woven tube which is enclosed, more particularly wound, by a heat-resistant foil, more particularly a metal foil.

Alternatively to this tubular formation of the insert part the latter does not extend over the complete perimeter of the wire bundle but only over a restricted angular region. The pressure element preferably extends identically over the same angular region as the insert part. In order to achieve a reliable seal it is hereby preferably proposed that the insert part is clamped in a separation plane of the tool mould. For this it is proposed by way of example that the insert part has in the region of the separation plane radially protruding edge regions which are clamped.

Generally in an expedient design the pressure element is provided with a sealing lip. The sealing lip is preferably formed as a rib-like element which runs circumferentially along a sealing line. The surface pressure force is hereby increased for a good seal. Expediently the sealing lip is therefore formed as a substantially rigid element. Alternatively to this the possibility exists that the sealing lip is formed as an elastic element, by way of example as a rubber seal.

Expediently the pressure element is assigned an opposing abutment wherein the insert part is clamped between the pressure element and the abutment. The pressure element and the abutment therefore preferably make up a clamping or pressure ring which surrounds the wire bundle and the insert part in a ring. Its cross-sectional contour is therefore adapted to that of the insert part. The abutment is thereby like the pressure element formed as an independent preferably dimensionally-stable component and is by way of example likewise like the pressure element provided with a sealing lip.

Alternatively to this separate configuration the abutment is a partial region of a wall of the tool mould itself. The pressure element as well as the abutment are preferably each formed as a half shell.

It is furthermore preferably provided that the pressure element has edge regions with which it bears on the abutment. The abutment itself is preferably formed approximately U-shaped and the insert part fits with a tight fit therein. The pressure element engages in the opening open at the top of the U-shaped recess and preferably has an end section which extends out in wedge fashion and which is clamped between the abutment and the insert part.

BRIEF DESCRIPTION OF THE SEVERAL VIEWS OF THE DRAWING

Embodiments of the invention will now be explained in further detail with reference to the figures. These show each in simplified illustrations.

DESCRIPTION OF THE INVENTION

Figure 1:
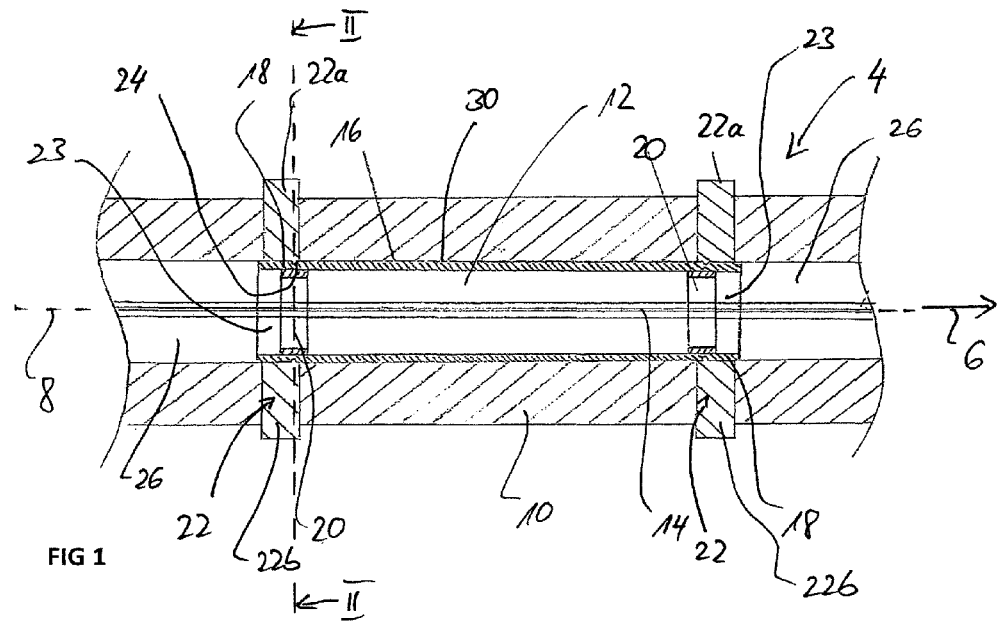
FIG. 1 a longitudinal sectional view through a tool mould having the wire bundle as well as the insert part inserted therein.

In the drawings the similar acting parts are provided with the same reference numerals.

Figure 3:
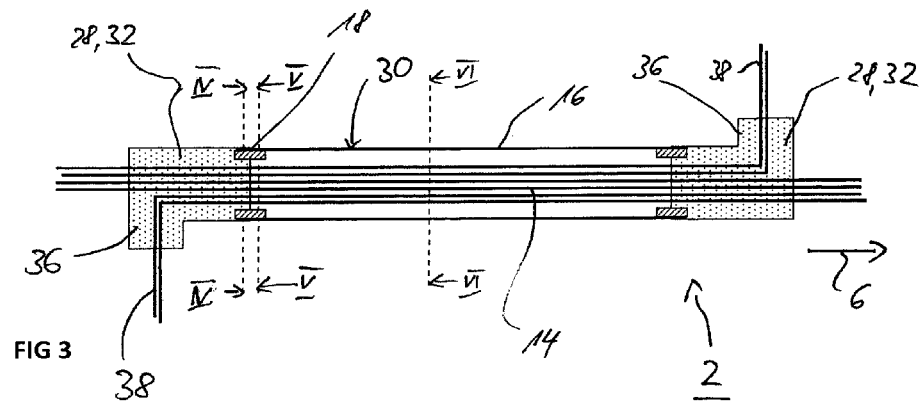
FIG. 3 a longitudinal sectional view through a cable harness.
Figure 4:
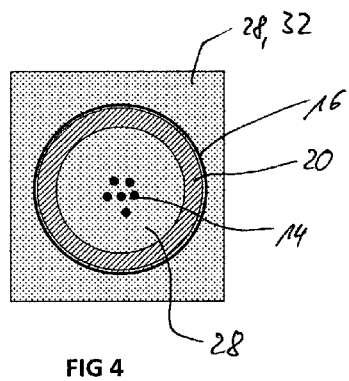
FIG. 4 a cross-sectional view through the cable harness according to the sectional line IV-IV in FIG. 3.
Figure 5:
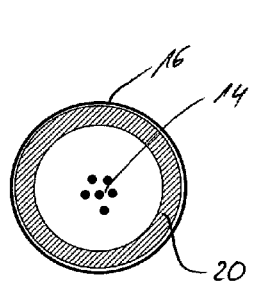
FIG. 5 a cross-sectional view of the cable harness according to the sectional line V-V in FIG. 3.
Figure 6:
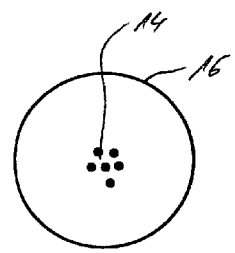
FIG. 6 a cross-sectional view of the cable harness along the sectional line VI-VI in FIG. 3; as well as FIG. 7 a cross-sectional view comparable with FIG. 2 of the tool mould with an alternative configuration of the insert part.

The tool mould 4 illustrated in FIG. 1 is used for producing the cable harness 2 illustrated in FIG. 3. The tool mould 4 as well as the cable harness 2 each extend in the longitudinal direction 6 of the cable. The tool mould 4 thereby normally has two tool parts formed in the manner of half shells which are divided along a tool separation plane 8 extending in the cable longitudinal direction 6. A wall 10 of the tool mould defines a free interior space 12 in which a wire bundle 14 as well as an insert part 16 formed as a heat protection element are inserted. The wire bundle 14 is normally wound up additionally by a banding which is not shown in further detail here.

The insert part 16 thereby extends in the cable longitudinal direction 6 between two end regions 18. In each end region 18 there is a support element designed as a support ring 20 which on the one side surrounds the wire bundle 14 and on the other side is covered by the inverted respective region 18b of the insert part 16. The insert part 16 thereby protrudes in part in the cable longitudinal direction 6 over each support ring 20.

A free space is formed between the wire bundle 14 and the support ring 20 so that the wire bundle 14 is guided loosely through the insert part. The distance between the wire bundle 14 and the insert part 16 thereby corresponds roughly to the sleeve thickness of the casting compound 28 surrounding the wire bundle 14.

The tool mould 4 furthermore has two clamping rings 22 spaced from one another in the cable longitudinal direction 6 and formed from a pressure element 22a and an abutment 22b for this. The clamping rings 22 each define an opening 23 through which the wire bundle 14 is guided. The pressure element 22a as well as the abutment 22b are thereby mounted movable in the radial direction inside the wall region 10 of the tool mould 4, at least the pressure element 22a, so that a radial pressure force exerted on the pressure element 22a is transferred via the pressure element 22a to the insert part 16.

As can be seen from FIG. 1 the support ring 20 is arranged in the region of the respective pressure element 22a so that the insert part 16 is clamped between each pressure element 22a or the abutment 22b respectively, and the support ring 20.

In order to improve the sealing action and increase the surface pressure force applied, both the pressure element 22a and the abutment 22b have a sealing lip which is moulded as a clamping or sealing rib 24 and which as a whole runs completely round the entire surface of the insert part 16.

The tool mould is divided at the openings 23 by the two clamping rings 22 into several partial areas, three in the design variation of FIG. 1, namely into two outer regions and one central region. The insert part 16 runs in the central region, and extends into the outer regions only partially by the end regions 18. These two outer regions of the free interior space 12 thereby each define a casting chamber 26 which is filled with a casting compound 28 (see FIG. 3).

Complementary with the variation illustrated in FIG. 1 the individual wires of the wire bundle 14 are preferably still guided through a separator (not shown here in further detail) so that the central region is sealed from the two casting chambers 26 also in the central area surrounded by the insert part 16.

To produce the cable harness 2 the wire bundle 14 is inserted together with the support rings 20 and the insert part 16 into the tool mould 4. If—as by way of example with the embodiment according to FIGS. 2 to 6—there is a tubular insert part 16 as well as an annular support element 20 then the wire bundle 14 is guided through the respective support ring 16 and then the tubular insert part 16 is pushed over the wire bundle 14 and over the support rings 20. The support rings 20 are positioned in the tool mould 4 in the region of the clamping rings 22. The two tool halves are then closed. A contact pressure force applied externally is then exerted via the pressure element 22a which is designed in particular in the manner of a cable pressure strip, so that the insert part 16 is clamped between the pressure element 22a and the support ring 20. The casting compound 28 is then introduced into the casting chambers 26 through injection casting openings which are not shown in further detail here. The casting compound 28 is in particular a polyurethane foam system which typically has a very high initial viscosity.

The entire cavity in the casting chamber 26 is then filled by the expanding casting compound 28. The partial region of the end regions 18 extending into the casting chamber 26 is then embedded in the casting compound 28. As a result of the high viscosity the casting compound 28 is also placed circumferentially around the insert part 16. The casting compound 28 therefore projects between the inside of the pressure element 22a or the abutment 22b and the insert part 16. The sealing rib 24 restricts the expansion in the cable longitudinal direction 6. Through this measure it is therefore reliably ensured that a defined clear separation point is formed and the casting compound 28 does not project into the central region. The outside of the insert part 16 in this central region therefore forms a free outer side 30 which is not encased by the casting compound 28. A sheath 32 formed by the casting compound 28 therefore adjoins this free outer side 30. This sheath has in the embodiment a rectangular cross-sectional contour.

Figure 2:
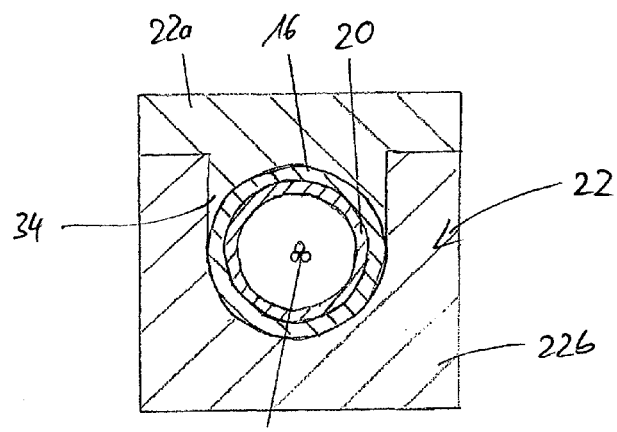
FIG. 2 a cross-sectional view through the tool mould according to FIG. 1 along the line II,II.

In order to achieve a reliable seal in the boundary area between the sheath 32 and the free outer side 30, in the embodiment of FIG. 2 the abutment 22b has a roughly U-shaped opening in which the insert part 16 is placed together with the support ring 20 and the wire bundle 40. The pressure element 22a is placed on the abutment 22b in the manner of a T-shaped pressure strip. Both the pressure element 22a and the abutment 22b are each designed with a concave curvature on the inside corresponding to the contour of the support ring 20. Two end portions 34 extending out in wedge fashion are thereby produced in the connection with the U-shaped receiving area on the sides of the pressure element 22a.

As an alternative to this the pressure element 22a and abutment 22b are formed by two similar shaped half-shell elements. The separation plane between the pressure element 22a, 22b preferably corresponds to the tool separation plane 8.

As can be further seen from the cable harness illustrated in FIG. 3, branches 36 are formed in the two opposing sheaths 32 so that a partial bundle 38 of the wire bundle 14 is branched off from the cable longitudinal direction 6. The partial bundle 38 is thereby likewise surrounded by the sheath 32 so that the branch 36 is held overall dimensionally stable and the exit angle of the partial bundle 38 is fixedly defined. Furthermore it can be seen that the wire bundle 14 again exits from the sheaths 32. The sheaths 32 are therefore formed only in the region of the branch 36. The wire bundle 14 as well as the partial bundle 18 are then guided further on to the electrical components to which they are connected. For insertion into a respective housing of the electrical components sealing pockets are thereby formed for example on the respective wire bundle 14 or partial bundle 18, and are preferably likewise formed as a cast part.

From FIGS. 4 to 6 can be seen again the individual cross-sectional geometries in the various different regions, namely in the region of the support ring 20 surrounded by the sheath 32 (FIG. 4), in the free end region 18 directly adjoining the sheath 32 (FIG. 5), as well as in the central region between the two sheaths 32 (FIG. 6). As a result of the special manufacturing method the support ring 20 which is embedded in the sheath 32 and extends out therefrom, is arranged in the end region 18.

With the design variation illustrated in FIGS. 3 to 6 the insert part 16 is formed tubular and therefore surrounds the wire bundle 14 around the entire periphery. The free outer side 30 which protects the wire bundle 14 more particularly against the effects of heat, thereby preferably extends over several tens of centimeters. The cable harness 2 is arranged in the fully assembled state preferably in a motor vehicle and more particularly there in a heat-stressed partial area, by way of example in the engine chamber and/or in the region of the exhaust train.

The insert part 16 is thereby designed more particularly as a flexible tube, preferably in the manner of a hybrid tube with an inner woven or mesh tube which is wrapped round by a metal banding. With this design the cable harness 2 is formed very elastic and bending in the region of the free outer side 30 and can then be laid without problem even if bent.

Figure 7:
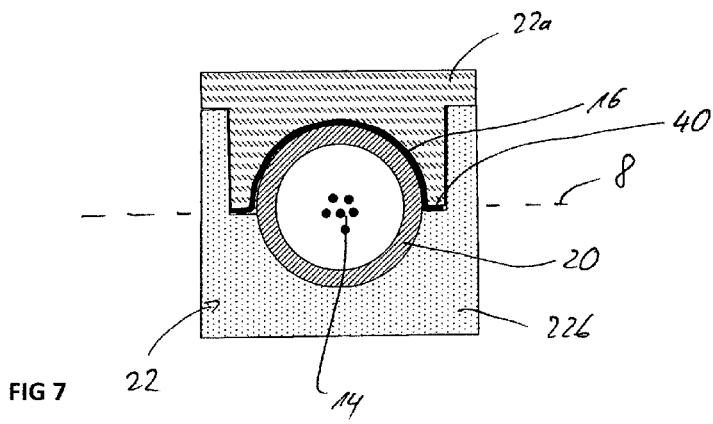

As an alternative to the tubular design of the insert part 16, according to the design variation illustrated in FIG. 7, the insert part extends only over a partial region and is by way of example formed in the manner of a solid, inherently rigid, by way of example metal, profile, as illustrated in FIG. 7. More expediently with an insert part 16 of this kind extending only over a restricted angular region, an annular support element 20 is used in order to be able to readily absorb the clamping forces. As an alternative to this the support element 20 is adapted to the contour of the insert part 16. As shown in FIG. 7, the insert part 16 in this embodiment has outwardly protruding marginal regions 40 which are clamped between the pressure element 22a and the abutment 22b. These marginal regions 40 thereby preferably lie inside the tool separation plane 8.

LIST OF REFERENCE NUMERALS

2 Cable harness
4 Tool mould
6 Cable longitudinal direction
8 Tool separation plane
10 Wall
12 Interior space
14 Wire bundle
15 Banding
16 Insert part
18 End region
20 Support ring
22 Clamping ring
22a Pressure element
22b Abutment
23 Opening
24 Sealing rib
26 Casting chamber
28 Casting compound
30 Free outer side
32 Sheath
34 End portion
36 Branch
38 Partial bundle
40 Marginal region

The invention claimed is:

1. A method of producing a cable harness with an electric wire bundle, the method comprising:
   placing an electric wire bundle into a tool mold with the wire bundle projecting through an opening;
   sealing an insert part in a cable longitudinal direction at the opening by pressing a pressure element in a radial direction against the insert part and taking up a radial compressive force by a support element inserted between the wire bundle and the insert part, and spacing the insert part from the wire bundle to form a free radial space therebeween; and
   surrounding the wire bundle inside the tool mold with casting compound to form a sheath surrounding the wire bundle in certain regions thereof.

2. The method according to claim 1, wherein the pressure element is a separate component part which is displaceable in a radial direction relative to a wall of the tool mold.

3. The method according to claim 1, wherein the insert part extends in the cable longitudinal direction between two end regions and the method comprises pressing a respective pressure element against the insert part in the end regions.

4. The method according to claim 3, wherein the tool mold is formed with two casting chambers spaced from one another and disposed at the mutually opposite end regions of the insert part in the cable longitudinal direction and the insert part is embedded into the casting compound only at its end regions.

5. The method according to claim 1, wherein the pressure element is formed with a sealing lip.

6. The method according to claim 1, wherein the pressure element presses the insert part against an opposing abutment so that the pressure element and the abutment make up a clamping ring which surrounds the wire bundle and the insert part in the form of a ring.

7. A cable harness, comprising:
   an electric wire bundle surrounded in certain regions by a sheath made of a casting compound;
   an insert part embedded in said casting compound and projecting from said casting compound; and
   a support element disposed between said insert part and said wire bundle in an end region of said insert part that is not surrounded by said sheath.

8. The cable harness according to claim 7, wherein said insert part is spaced from said wire bundle with a free radial space formed therebetween.

9. The cable harness according to claim 7, wherein said insert part is a heat protection element for said wire bundle.

10. The cable harness according to claim 7, wherein said sheath is one of two sheaths formed at a spacing distance from one another, and wherein said insert part extends between said two sheaths.

11. The cable harness according to claim 9, wherein said insert part is a tubular element surrounding said wire bundle.

12. The cable harness according to claim 9, wherein said insert part is disposed to surround said wire bundle only in certain regions.

13. The cable harness according to claim 7, wherein said insert part is a heat protection element and is formed with a free outer side, wherein said insert part surrounds said wire bundle only in certain regions and is formed as a profile or a plate, or said insert part surrounds said wire bundle in tubular fashion and has a foil wound around said wire bundle.

14. The cable harness according to claim 7, wherein said sheath has a branch so that a partial bundle of the wire bundle is branched off with dimensional stability.

* * * * *